United States Patent [19]

Brown et al.

[11] Patent Number: 5,004,205
[45] Date of Patent: Apr. 2, 1991

[54] HIGH-RANGE AND RESOLUTION DETERMINATE MOUNT AND POSITIONER

[75] Inventors: Donald G. Brown, Newbury Park; Andrew F. Onufrak, Canoga Park, both of Calif.

[73] Assignee: Rockwell International Corporation, El Segundo, Calif.

[21] Appl. No.: 533,201

[22] Filed: Jun. 4, 1990

[51] Int. Cl.⁵ .............................................. A47G 1/24
[52] U.S. Cl. ............................ 248/476; 74/424.8 R; 350/632; 350/634; 403/57
[58] Field of Search ............... 248/476, 487, 278, 485, 248/475.1, 466; 350/631, 632, 633, 357, 634, 636, 252; 403/57; 74/424.8

[56] References Cited

U.S. PATENT DOCUMENTS

| | | | |
|---|---|---|---|
| 3,029,660 | 4/1962 | Sears | 74/424.8 R |
| 3,037,397 | 6/1962 | Allen et al. | 74/424.8 R |
| 3,277,736 | 7/1964 | Goodman | 74/424.8 R |
| 3,319,481 | 5/1965 | Goodman | 74/424.8 R |
| 3,326,054 | 6/1967 | Canick et al. | 74/10.2 |
| 3,407,018 | 10/1968 | Miller | 248/278 X |
| 3,727,471 | 4/1973 | Botos | 74/89.15 |
| 3,953,113 | 4/1976 | Shull | 350/634 |
| 4,060,314 | 11/1977 | Heinz | 350/285 |
| 4,089,233 | 5/1978 | Sebald | 350/633 X |
| 4,295,710 | 10/1981 | Heinz | 350/310 |
| 4,298,248 | 11/1981 | Lapp | 350/634 |
| 4,373,404 | 2/1983 | Heinz | 350/289 |
| 4,382,709 | 5/1983 | Brown | 403/57 |
| 4,382,709 | 5/1983 | Brown | 403/57 |
| 4,442,524 | 4/1984 | Reeder et al. | 350/633 X |
| 4,576,057 | 3/1986 | Saari | 74/424.8 R |
| 4,664,487 | 5/1987 | Tam | 350/486 |
| 4,669,830 | 6/1987 | Hottori et al. | 350/357 |
| 4,790,201 | 12/1988 | Gheddo | 74/424.8 R |
| 4,867,000 | 9/1989 | Lentz | 74/424.8 R |

OTHER PUBLICATIONS

Frosch et al, "Positioning Device for Optical Components" IBM Technical Disclosure Bulletin, Mar. 1976.
Gunn et al, Design of Ring Resonator for Burst Mode Free Electron Laser, Jun. 8-10, 1987 AIAA-87-1280 p. 12.
S. V. Gunn and K. C. Sun, Design of Ring Resonator for Burst Mode Free Electron Laser, Jun. 8-10, 1987, AIAA-87-1280, p. 12.

*Primary Examiner*—Carl D. Friedman
*Assistant Examiner*—Daniel Hulseberg
*Attorney, Agent, or Firm*—H. Fredrick Hamann; Harry B. Field; Steven E. Kahm

[57] ABSTRACT

The invention relates to a device for accurately positioning an object, such as a mirror 3 used to precisely aim a laser. The invention uses kinematic principles to hold the object. Here a 2-2-2 kinematic bipod system is employed. The invention uses three actuators 5 to position the object. Each actuator acts as a bipod restricting the object in two of its six degrees of freedom. Each actuator has three degrees of freedom it can transmit to the object. The actuator can rotate on its single-axis flexure 7 so that the actuator cna rotate on one axis relative to support 4. Each actuator has a two-axis coincident flexure 8 on one end for allowing the object to be moved in two rotational degrees of freedom and the roller sleeve 50 allows a third rotational degree of freedom. Each actuator is positioned circumferencially about the central coordinate axis of the object to be moved, 120 degrees apart. Each actuator is powered by a stepper motor 6 which drives the differential roller screw accurately, providing translational movement to the system in the shortest length possible.

12 Claims, 5 Drawing Sheets

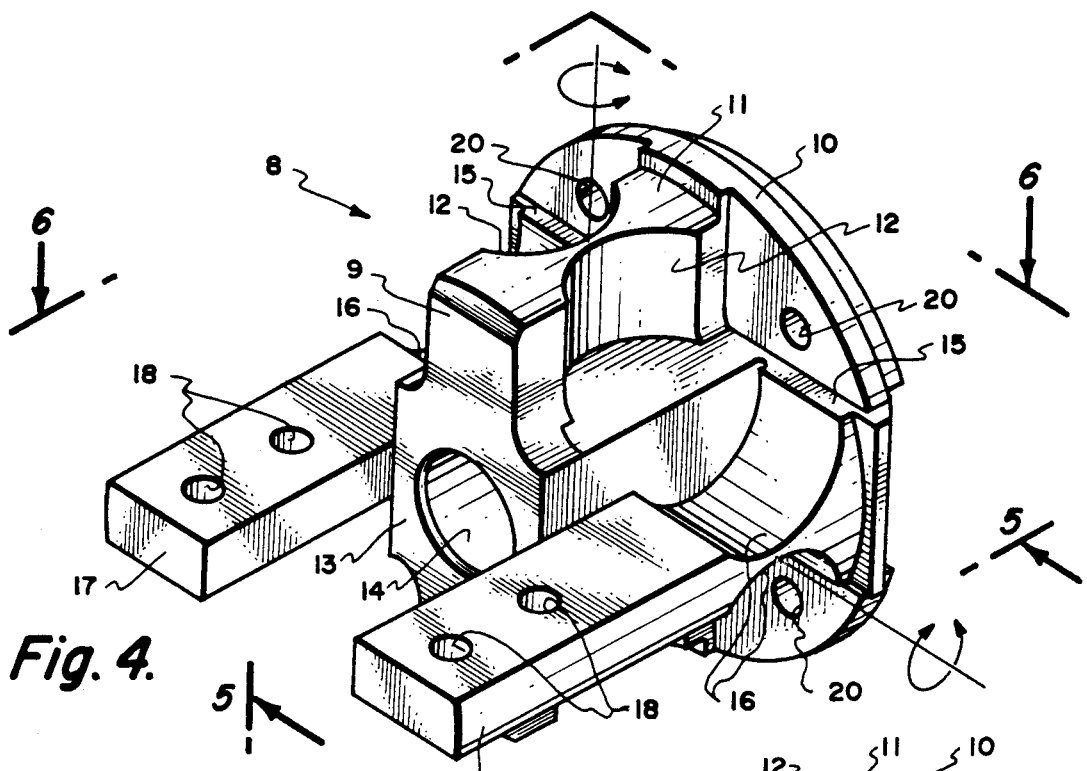
Fig. 4.
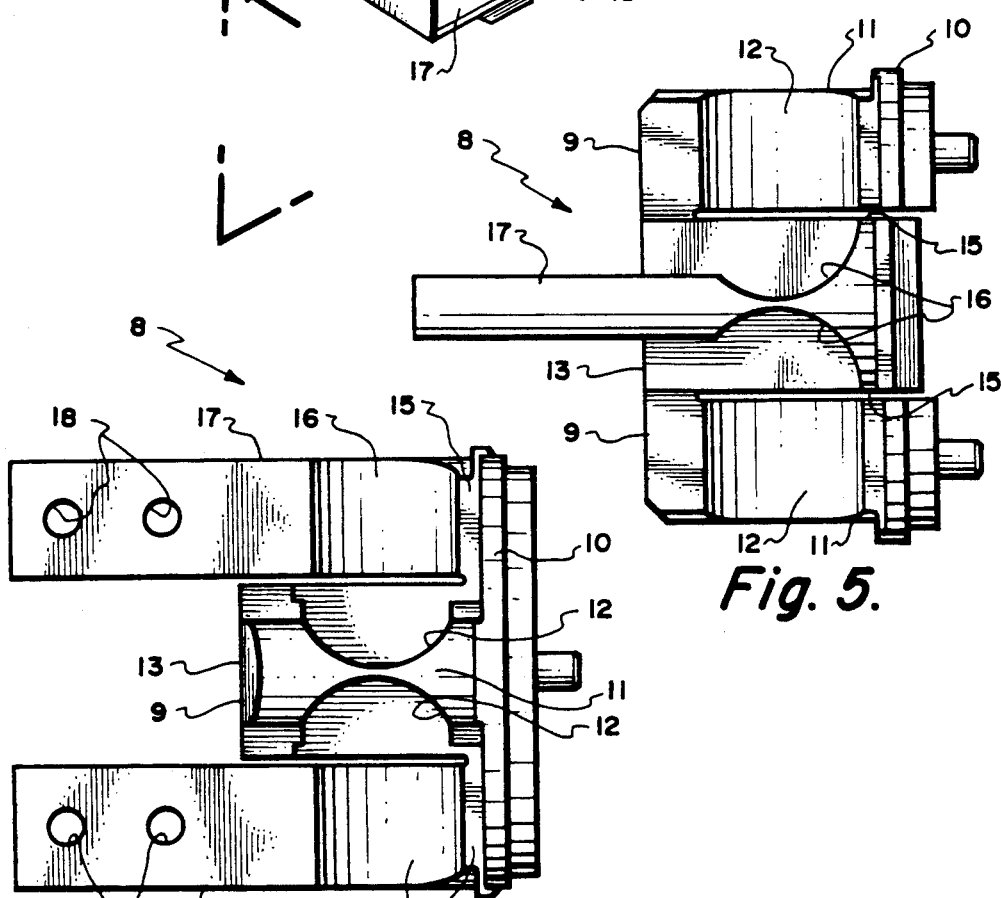
Fig. 5.
Fig. 6.

HIGH-RANGE AND RESOLUTION DETERMINATE MOUNT AND POSITIONER

STATEMENT OF GOVERNMENT INTEREST

The Government has rights in this invention pursuant to Contract (or Grant) No. DASG60-87-C-0011 awarded by the U.S. Department of Army.

CROSS REFERENCE TO RELATED APPLICATION

The two-axis coincident flexure as described herein is the subject of a co-pending application filed on even date herewith.

BACKGROUND OF THE INVENTION

There is a need for a device which can be used to very accurately position heavy objects over a greater range than heretofore possible and secure those objects in position without introducing stresses or strains to that object. One use for such a device is to position a mirror for a laser so accurately that the laser can be used to hit a small target at long range.

In order to accomplish this degree of accuracy and strain-free positioning, a kinematic mount must be employed. A body has six degrees of freedom which must be controlled. These are translation along the three rectangular coordinate axes and rotation about these axes.

To accurately position an object, a mount should have as few parts as possible. Too many parts may over constrain the object, unnecessarily complicating the positioning of the object and introducing position errors due to the tolerances of interconnecting parts.

OBJECTS OF THE INVENTION

The principle object of the invention is to hold an object and position it as accurately as possible over a large range of travel without introducing any stresses or strains to the object.

Another object of the invention is to reduce the actuator length while retaining the accuracy of the actuator.

A further object of the invention is to use as few parts as possible so as to reduce positioning errors due to tolerances in the machining of interconnecting parts and due to over constraining of the object.

A further object of the invention is to reduce errors in positioning due to the thermal expansion and contraction of different metals.

Another object of the invention is to decrease errors due to deformation and wear of parts over time and eliminate the possibility of loads from manufacturing tolerances.

Another object of the invention is to increase the linearity and repeatability of the positioning mechanism and increase the life and reliability of the mechanism.

Another object of the invention is to eliminate oils and gasses from the laser vacuum environment.

SUMMARY OF THE INVENTION

The present invention uses a three-point, bipod system to kinematically support and position an object. Each bipod has three rotational degrees of freedom at one end and a flexure approximately ½ way along its length. The invention uses a two-axis coincident flexure and a roller sleeve for the three degrees of rotational freedom. A differential roller screw actuator with a stepper motor is employed to accurately position the object with the least possible actuator length. The shaft of the actuator and the roller screws have a fused-in tungsten disulfide coating so that the shaft does not have to be lubricated. The actuator housing acts as a bipod in the kinematic support system. Each of the three actuators has a two-axis coincident flexure on one end which is attached to the object such that all the two axes flexure points are in the plane of and equal distance from the coordinate axis about which objects is to tip, tilt, and translate. The attachment points of the actuators form an equilateral triangle about the object's central coordinate axis. Each actuator employs a single-axis flexure which allows the actuator to pivot on one axis where the actuator is attached to the support. The actuator is preferably positioned such that it is balanced fore and aft of the single-axis flexure. The flexures used in this invention are highly reliable and eliminate many connecting parts when compared to other systems. Since the flexures do not require lubrication, there is no oil or grease to pollute the laser environment.

BRIEF DESCRIPTION OF THE DRAWINGS

FIG. 4 is a perspective view of the two-axis coincident flexure.

FIG. 5 is a side view of the two-axis coincident flexure looking along line 5—5 of FIG. 4.

FIG. 6 is a side view of the two-axis coincident flexure looking along line 6—6 of FIG. 4.

DETAILED DESCRIPTION OF THE INVENTION

Figure 1:
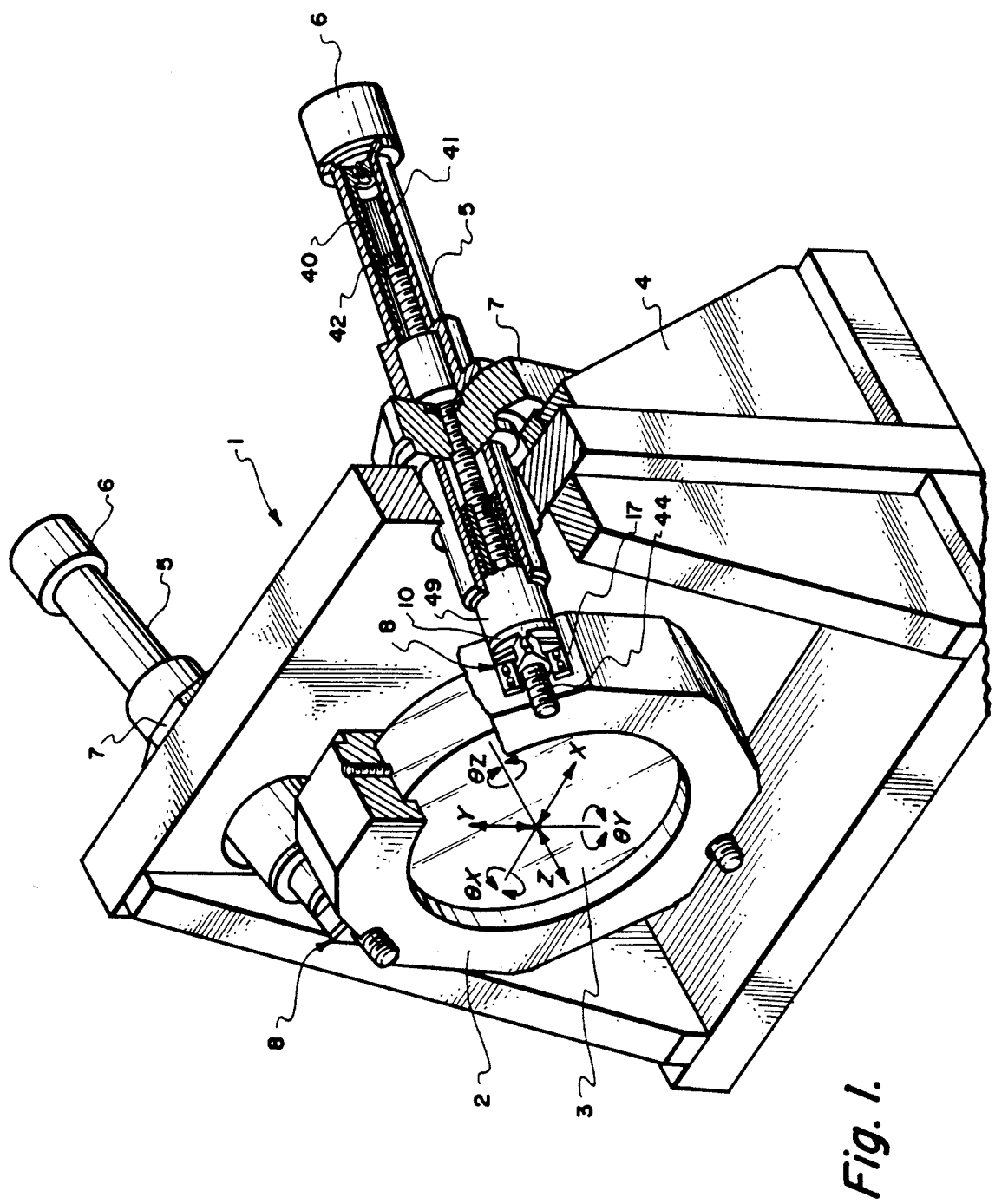
FIG. 1 is a perspective view of a mounted high-range and resolution determination mount and positioner shown with a cut-away view of one actuator.
Figure 3:
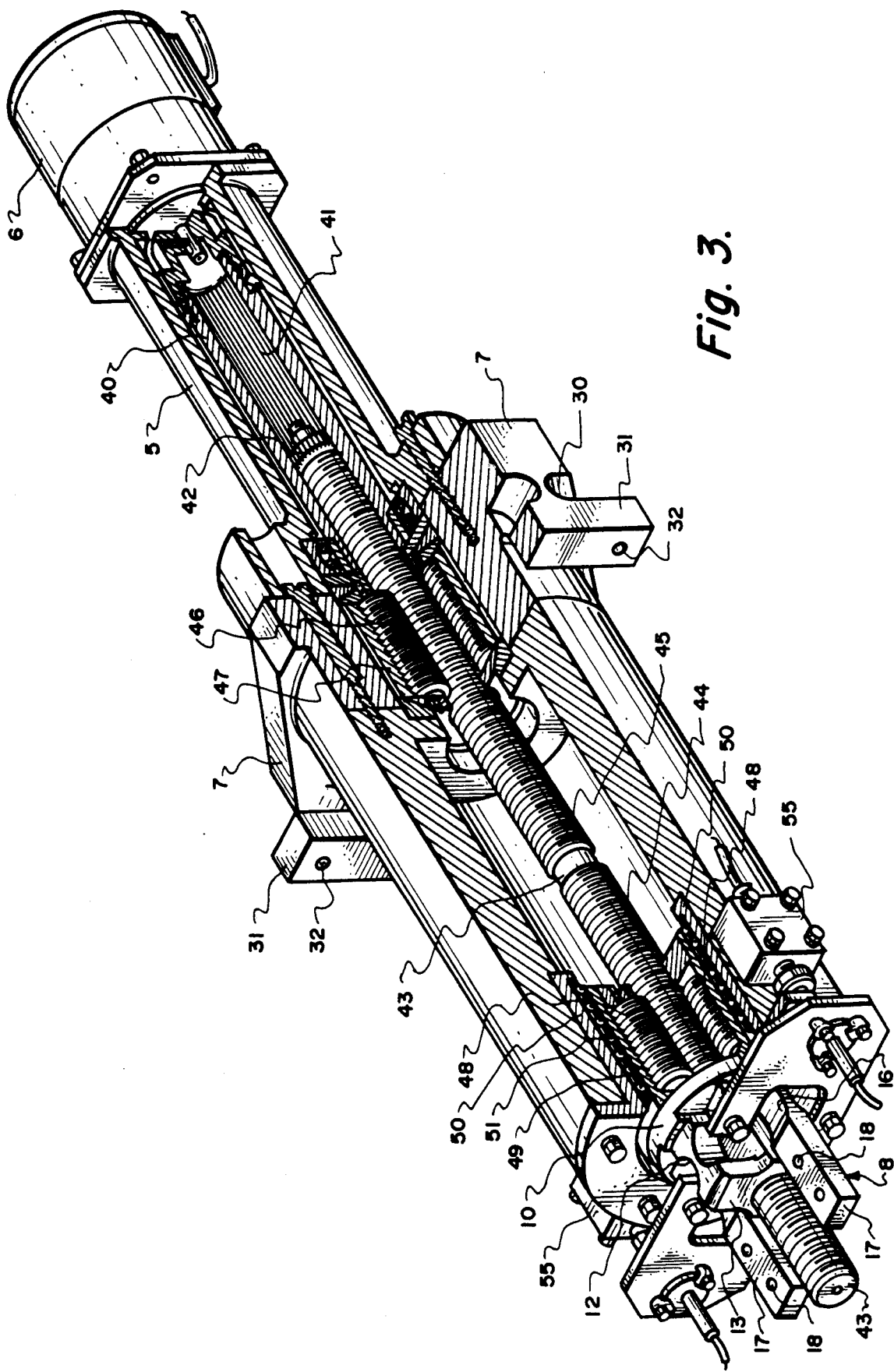
FIG. 3 is a cut-away perspective view of the actuator-bipod support.
Figures 7, 8:
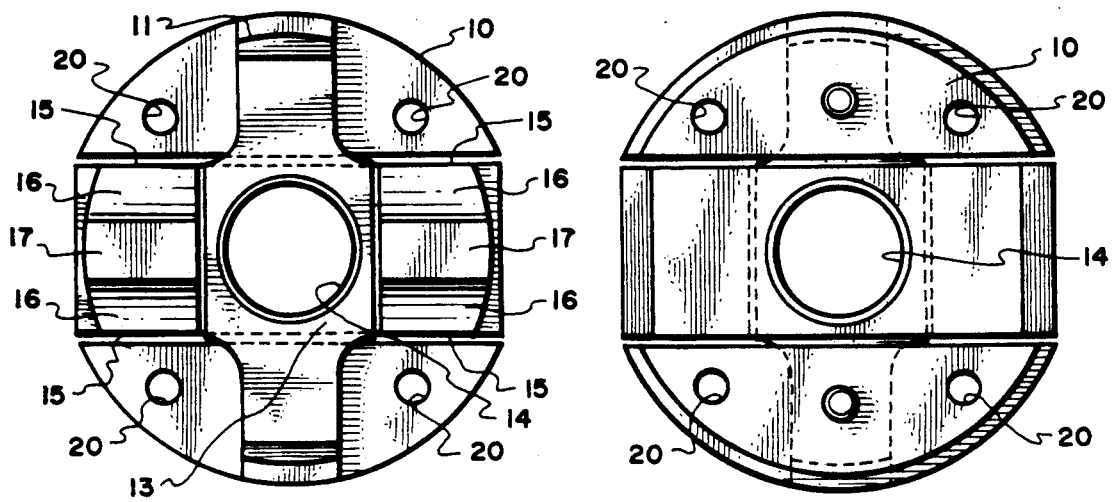
FIG. 7 is a top view of the two-axis coincident flexure.
FIG. 8 is a bottom view of the two-axis coincident flexure.

FIG. 1 shows a perspective view of the high-range resolution determination mount and positioner shown generally as 1. The object to be held and positioned as shown here is a mirror 3 used for directing a laser beam to hit a target. The mirror is held by mirror assembly 2 which securely holds the mirror. The mirror assembly preferably is built to absorb any stresses or strains caused by the actuators 5 so that no forces act on the mirror to distort it. The actuators 5 support and position the mirror assembly. Each actuator 5 is attached to the mirror assembly 2 by a two-axis coincident flexure 8. The actuators 5 are in turn attached to the support wall 4 by a single-axis flexure 7. The actuators are preferably balanced fore and aft on the single-axis flexures. The actuators 5 are driven by stepper motors 6. The two-axis coincident flexure 8 provides the invention with two degrees of freedom acting as if at a coincident point. This allows for simultaneous rotation about a vertical and horizontal axis acting as if at the same point at the center of the two-axis coincident flexure. The base 10 (see FIG. 4) of the two-axis coincident flexure is attached to the actuator by use of bolts (not shown) placed through holes 20. Bars 11 extend upward from base 10. Bars 11 support arms 9 which extend radially from core section 13. The core section has hole 14 through its center. Shaft 43 of the actuator 5 passes through hole 14, as best seen in FIGS. 1, 3, and 4. The core section extends downward to just above the base 10 leaving a gap between the base 10 and the core seciton 13. In order to form the two-axis coincident flexure out of one piece of metal, a cut is made through the base 10 and up between bars 11 and core 13 to arms 9. Arms 15 extend radially outward from the base of core section 13. There is a gap between the bottom of arms 15 and the top of base 10 to allow movement of the arms 15 without hitting the surface of base 10; thus, when the two-axis coincident flexure 8 flexes at 12, arms 15 can rotate freely above base 10. Since only small degrees of flexure are designed for this part, the gaps between base 10 and arms 15 need only be approximately ⅛th inch. Bars 17 extend upward from arms 15 and have flexure portions 16. Flexure portions 12 are cut into bar 11. Flexure portions 12 and 16 are preferably formed by making two semi-circular cuts back-to-back in bars 11 and 17. These cuts are designed to allow bars 11 and 17 to flex at a predetermined coincident point. Although semi-circular cuts are preferred, other shapes may be utilized to obtain predetermined flexure points. The flexure point for flexures 12 and 16 are in the same plane so that the two-axis flexure acts as if there were a point in the center of the hole 14 at which the two-axis coincident flexure 8 was bending about. The two-axis coincident flexure 8 therefore provides two degrees of freedom for the kinetic mount and positioner. The goal of the invention is to make a very precise positioner. Therefore, it is important to eliminate all possible means of introducing errors to the position of the mirror. Keeping this in mind, it is preferred to machine the two-axis coincident flexure 8 out of one piece of metal so that there are no temperature-introduced expansions or contractions of different metals which could introduce errors in precision of where the flexure points are. A further advantage of having the entire coincident two-axis flexure made out of the same material is to eliminate all connections which may introduce errors in the position of the flexure point. Such errors may be caused by parts not fitting precisely. This can be caused by a number of factors including machining tolerance errors, wearing of parts, and temperature changes. Other advantages of having the two-axis coincident flexure made out of one piece of metal is there is no friction between part; therefore, there is zero stiction or backlash which could introduce errors in position. Also, no lubrication of parts is required. This is extremely important in a laser vacuum system since any contaminant could cause severe damage to the mirrors. A further advantage is that a flexure of this style is insensitive to dirt which could get between parts and affect the positioning of the object. The two-axis coincident flexure as disclosed provides linearity and repeatability over a long service life. The flexure of this design has a wide range of possible spring rates and sizes to fit the design needs of the positioner. Another advantage is that the flexure of this design provides a low and predictable hysteresis.

The two-axis coincident flexure, as described above, is the subject of a copending application filed on even date herewith and hereby incorporated by reference.

Figure 9:
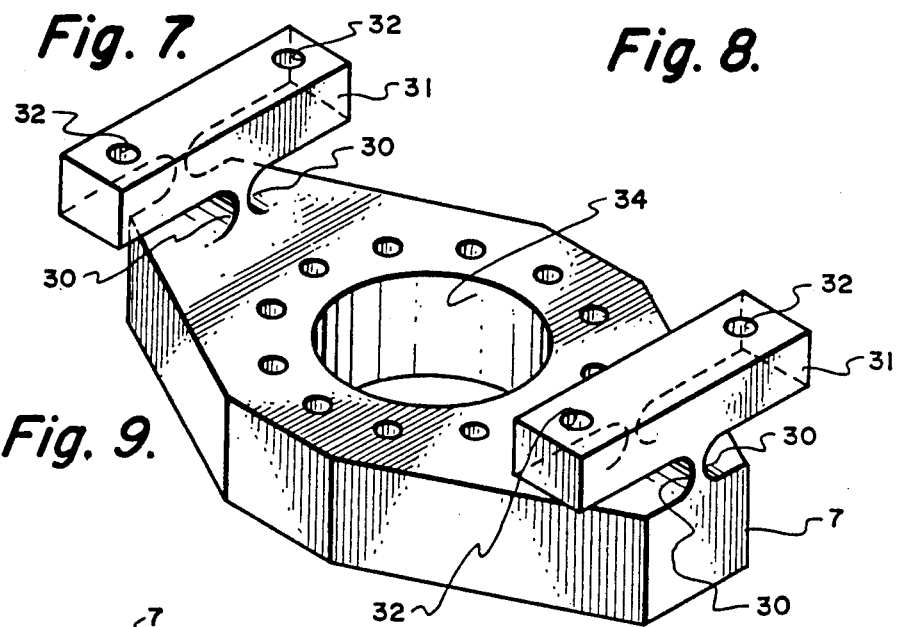
FIG. 9 is a perspective view of the one-axis flexure.
Figures 10, 11:
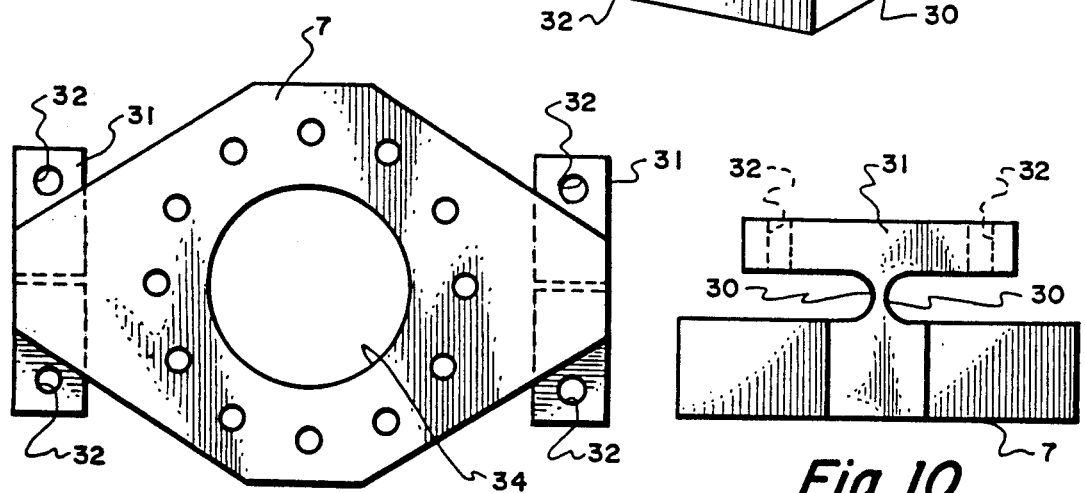
FIG. 10 is a side view of the one-axis flexure.
FIG. 11 is a bottom view of the one-axis flexure.

A single-axis flexure 7 connects actuator 5 to the support wall 4 and allows the actuator to rotate on one axis about the flexure point in the flexure portion 30 as can be seen in FIGS. 9–11. Again, the flexure portion is preferably formed by making a semi-circular cut in the metal. It is preferable to machine the single-axis 7 out of the same piece of material for the same reasons as cited above for the two-axis coincident flexure.

Figure 2:
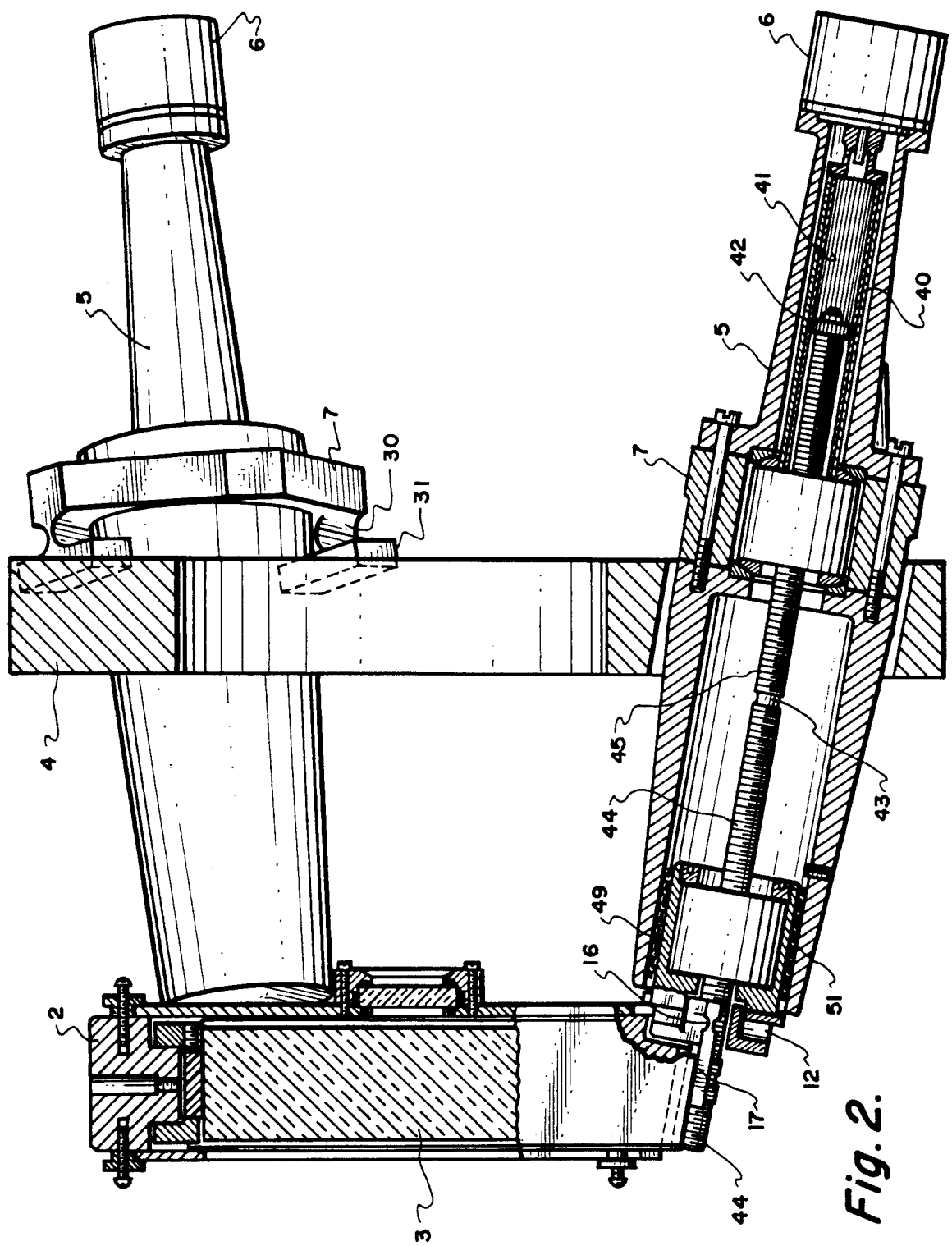
FIG. 2 shows a top view of two actuators attached to the support wall and the mirror assembly. The top actuator shows the single-axis flexure. The bottom actuator is a cut-away view, showing the shaft, spline, and gear housings.

The goal of positioning an object very precisely requires an actuator with the ability to make very small and accurate linear translational steps. Preferably the actuator must be short enough to sit in a small amount of space. To obtain such fine degrees of adjustment, a differential screw actuator 5 (as shown in FIGS. 2 and 3) is employed. A stepper motor 6 drives the actuator. The stepper motor rotates a tube 40 with grooves 41 on its inside surface, which mesh with spline 42 on shaft 43. When stepper motor 6 rotates, spline 42 will drive the shaft 43. Shaft 43 is divided into two sections, 44 and 45. Each section has different pitch threads. Threaded rollers 46 are in fixed housing 47. Shaft 43 moves relative to threaded rollers 46 and can travel back and forth in tube 40. Threaded rollers 48 are fixed in movable housing 49 which is attached to the two-axis coincident flexure 8. Movable housing 49 is enclosed in roller sleeve 50. Balls 51 allow the movable housing 49 to slide forward and backward within the housing and rotate in the housing, thus preventing any torque forces from being applied to the mirror assembly 2 and thus to the two-axis coincident flexure 8. There is preferably a position limit switch 55 to prevent damaging the actuator. Preferably the pitch of the threads on shaft 43 are such that the difference in the threads moves the two-axis flexure by four micro inches per step of stepper motor. Preferably, the actuator used will have a range of 1.75 inches and have an overall length of approximately two feet. The resolution of the mirror is 0.3 micro radians in this embodiment of the invention with the two-axis flexure point approximately six inches from the mirror's central axis. Threaded rollers were used in the actuator in this embodiment instead of the roller balls used in other actuators because the balls in the roller ball type actuator require a wider groove in the shaft 43 and therefore a lead that is five times coarser. Using a wider groove, the shaft would have to be approximately five times longer to obtain the same linear translation range as with a threaded roller. Such lengths would cause the mount to be too large and unstable. Due to weight and space constraints it is preferred to use the threaded rollers and closer spaced threads on shaft 43. It is preferred to have a substance such as tungsten disulfide impregnated on the shaft and threaded rollers as a lubricant substitute. Tungsten disulfide provides the required lubricating properties without giving off any gasses or liquids which could contaminate the laser's vacuum environment and damage the laser.

A further reason why threaded roller actuators were used instead of roller ball actuators is that the threaded rollers are six times stiffer than roller balls. Therefore the actuator is more accurate linearly than the roller ball design. The threaded roller preferrably has a stiffness of one million pounds per inch.

Due to the accuracy usually required in the mounting of precision optical systems, kinematic principles are often found to be necessary. A body in space has six degrees of freedom. These are translational along the three rectangular coordinate axes and rotation about these axes. A body is fully constrained when each of these possible movements is individually prevented from occurring. If a movement in any particular degree of freedom is prevented by more than one mechanism, then a body is over constrained and its support system becomes redundant. All but one of the constraints will be ineffective or the body will be deformed by the multiple constraint and loads will be indeterminate. Typical mounting systems that are not sensitive to these deformations usually use redundant configuration for simplicity and low cost. A mount that satisfies the requirement of fixing all degrees of freedom without redundant constraint is kinematic and a good optical mount will always employ some version of it. Use of a kinematic mounting system also results in relative insensitivity to thermal differential distortions and manufacturing tolerances and provides greater positioning control. In this invention, a 2-2-2 kinematic system has been employed. Each of the three actuators acts as a bipod and restrains two degrees of freedom. Each actuator has three rotational degrees of freedom at the two-axis coincident flexure end. Those degrees of freedom being rotation on two axes of the two-axis coincident flexure 8 and rotation of the roller sleeve 50. The position of the object can now be positively controlled in all six degrees of freedom. By adjusting the length of the three actuators, any given orientation can be selected for the object. In the instant case, if all the two-axis coincident flexures are aligned in the same plane with the surface of the mirror and the actuators are attached at points 120 degrees apart around the mirror assembly, equidistant from the center of the mirror, then the surface of the center of the mirror will be the point about which the mirror will tip, tilt, and translate, making it easier to calculate the actuator positions necessary to point the mirror in the desired direction to hit a target.

The flexures of this design do not require any axial preloading to make the positioner work without backlash as other designs require. The actuator shaft also does not require any preloading force on it as some other designs such as the ball roller actuators require. The backlash is eliminated by preloading internal to the roller sleeve. This helps make this design more accurate by eliminating possible errors due to incorrect preloads or errors caused by the preload mechanism's tolerances.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A high range and resolution determinate mount and positioner comprising:
   three bipods each with a differential roller screw actuator, each actuator having a stepper motor,
   a tube connected to and turned by the stepper motor, the tube having a plurality of grooves on its inside surface,
   a shaft having a first threaded portion with a first pitch and a second threaded portion with a second pitch, the shaft having a spline for engaging the grooves in the tube,
   a first threaded roller with a first pitch for directly engaging the first threaded portion of the shaft, the first threaded roller fixed to the actuator so that the shaft moves relative to the actuator and the threaded roller remains fixed,
   a second threaded roller with a second pitch for directly engaging the second threaded portion of the shaft, the second threaded roller fixed to a roller sleeve, which can move relative to the actuator and provide a linear movement directly proportional to the number of turns of the stepper motor and the relative pitch of the threads on the shaft to form a differential roller screw actuator,
   a single-axis flexure attached to each actuator and to a support, and
   a two-axis coincident flexure attached to each actuator and to an object to be moved.

2. A high-range and resolution determinate mount and positioner as in claim 1 where each actuator has two ends and a middle and the two-axis coincident flexure is attached at one end of each actuator.

3. A high-range and resolution determinate mount and positioner as in claim 2 where there is a three degree of freedom point at one end and single axis flexure at the middle of each actuator.

4. A high-range and resolution determinate mount and positioner as in claim 3 where the actuator is balanced on the single-axis flexure, such that half the weight of the actuator is on each side of the single-axis flexure.

5. A high-range and resolution determinate mount and positioner as in claim 4 where there are three actuators, each having the three degree of freedom point in the same plane and equal distance from a tip, tilt, and translation axis of the object.

6. A high-range and resolution determinate mount and positioner as in claim 5 where the shaft and the threaded roller are impregnated with a tungsten disulfide coating as a lubrication substitute.

7. A high-range and resolution determinate mount and positioner as in claim 1 where the two-axis coincident flexure consists of one piece of metal having,
   a base, the base having a center and a top
   a first pair of bars, each bar on an opposite end of a diametric line through the center of the base, and extending upward from the base,
   each bar having a flexure portion,
   a core having a top and a bottom,
   a first pair of arms, each arm connecting one of the first bars to the top of the core,
   a second pair of arms perpendicular to the first pair of arms, extending from the bottom of the core,
   a second pair of bars one on each of the second pair of arms, each bar having a flexure portion,
   the flexure portions in all the bars being co-planar.

8. A high-range and resolution determinate mount and positioner as in claim 1 where the two-axis coincident flexure consists of one piece of metal having,
   a base, the base having a center and a top
   a first pair of bars, each bar on an opposite end of a diametric line through the center of the base, and extending upward from the base,
   each bar having a flexure portion,
   a core having a top and a bottom,
   a first pair of arms, each arm connecting one of the first bars to the top of the core,
   a second pair of arms perpendicular to the first pair of arms, extending from the bottom of the core,
   a second pair of bars one on each of the second pair of arms, each bar having a flexure portion, the flexure portions in all the bars being co-planar.

9. A high-range and resolution determinate mount and positioner as in claim 1 where the two-axis coincident flexure consists of one piece of metal having,
 a base, the base having a center and a top
 a first pair of bars, each bar on an opposite end of a diametric line through the center of the base, and extending upward from the base,
 each bar having a flexure portion,
 a core having a top and a bottom,
 a first pair of arms, each arm connecting one of the first bars to the top of the core,
 a second pair of arms perpendicular to the first pair of arms, extending from the bottom of the core,
 a second pair of bars one on each of the second pair of arms, each bar having a flexure portion,
 the flexure portions in all the bars being co-planar.

10. A high-range and resolution determinate mount and positioner as in claim 1 where the two-axis coincident flexure consists of one piece of metal having,
 a base, the base having a center and a top
 a first pair of bars, each bar on an opposite end of a diametric line through the center of the base, and extending upward from the base,
 each bar having a flexure portion,
 a core having a top and a bottom,
 a first pair of arms, each arm connecting one of the first bars to the top of the core,
 a second pair of arms perpendicular to the first pair of arms, extending from the bottom of the core,
 a second pair of bars one on each of the second pair of arms, each bar having a flexure portion,
 the flexure portions in all the bars being co-planar.

11. A high-range and resolution determinate mount and positioner as in claim 1 where the two-axis coincident flexure consists of one piece of metal having,
 a base, the base having a center and a top
 a first pair of bars, each bar on an opposite end of a diametric line through the center of the base, and extending upward from the base,
 each bar having a flexure portion,
 a core having a top and a bottom,
 a first pair of arms, each arm connecting one of the first bars to the top of the core,
 a second pair of arms perpendicular to the first pair of arms, extending from the bottom of the core,
 a second pair of bars one on each of the second pair of arms, each bar having a flexure portion,
 the flexure portions in all the bars being co-planar.

12. A high-range and resolution determinate mount and positioner as in claim 1 where the two-axis coincident flexure consists of one piece of metal having,
 a base, the base having a center and a top
 a first pair of bars, each bar on an opposite end of a diametric line through the center of the base, and extending upward from the base,
 each bar having a flexure portion,
 a core having a top and a bottom,
 a first pair of arms, each arm connecting one of the first bars to the top of the core,
 a second pair of arms perpendicular to the first pair of arms, extending from the bottom of the core,
 a second pair of bars one on each of the second pair of arms, each bar having a flexure portion,
 the flexure portions in all the bars being co-planar.

* * * * *